(12) United States Patent
Jiang

(10) Patent No.: US 8,904,532 B2
(45) Date of Patent: Dec. 2, 2014

(54) METHOD, APPARATUS AND SYSTEM FOR DETECTING BOTNET

(75) Inventor: Wu Jiang, Beijing (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 158 days.

(21) Appl. No.: 13/452,214

(22) Filed: Apr. 20, 2012

(65) Prior Publication Data

US 2012/0204264 A1 Aug. 9, 2012

Related U.S. Application Data

(63) Continuation of application No. PCT/CN2010/077640, filed on Oct. 11, 2010.

(30) Foreign Application Priority Data

Oct. 20, 2009 (CN) .......................... 2009 1 0206068

(51) Int. Cl.
*H04L 29/06* (2006.01)
*H04L 12/24* (2006.01)

(52) U.S. Cl.
CPC ........ *H04L 63/1425* (2013.01); *H04L 63/1408* (2013.01); *H04L 41/12* (2013.01); *H04L 63/1458* (2013.01); *H04L 2463/144* (2013.01)
USPC ............................................. 726/23; 726/25

(58) Field of Classification Search
CPC .................................................. H04L 63/1408
USPC ..................................................... 726/23, 25
See application file for complete search history.

(56) References Cited

U.S. PATENT DOCUMENTS

| 2008/0080518 | A1* | 4/2008 | Hoeflin et al. | ........... 370/395.42 |
| 2008/0155694 | A1* | 6/2008 | Kwon et al. | ..................... 726/23 |
| 2009/0119778 | A1* | 5/2009 | Bhuyan | .......................... 726/25 |
| 2009/0282478 | A1 | 11/2009 | Jiang | |

FOREIGN PATENT DOCUMENTS

| CN | 101282340 A | 10/2008 |
| CN | 1013211171 A | 12/2008 |
| CN | 101360019 A | 2/2009 |

(Continued)

OTHER PUBLICATIONS

1st Office Action in corresponding Chinese Patent Application No. 200910206068.4 (Aug. 3, 2012).
International Search Report in corresponding International Patent Application No. PCT/CN2010/077640 (Jan. 20, 2011).

(Continued)

*Primary Examiner* — Brandon Hoffman
*Assistant Examiner* — Thong Truong
(74) *Attorney, Agent, or Firm* — Leydig, Voit & Mayer, Ltd.

(57) ABSTRACT

A method, an apparatus, and a system for detecting Botnet are disclosed. The method for detecting Botnet includes: obtaining an address information about a control host in a Bot sample by using an auto breakout environment; sending a query request message to a traffic analysis device to obtain an address information of a Bot host connected with the control host, in which the query request message carries the address information about the control host; and receiving a query response message returned by the traffic analysis device, in which the query response message carries the address information of the Bot host connected with the control host. The method for detecting Botnet can obtain the Botnet information in real time and construct a topology of the Botnet.

11 Claims, 4 Drawing Sheets

(56) References Cited

FOREIGN PATENT DOCUMENTS

| CN | 101588276 | A  | 11/2009 |
|----|-----------|----|---------|
| CN | 101651579 | A  | 2/2010  |
| EP | 1739921   | A1 | 1/2007  |

OTHER PUBLICATIONS

Written Opinion of the International Searching Authority in corresponding International Patent Application No. PCT/CN2010/077640 (Jan. 20, 2011).

* cited by examiner

METHOD, APPARATUS AND SYSTEM FOR DETECTING BOTNET

CROSS-REFERENCE TO RELATED APPLICATIONS

This application is a continuation of International Application No. PCT/CN2010/077640, filed on Oct. 11, 2010, which claims priority to Chinese Patent Application No. 200910206068.4, filed on Oct. 20, 2009, both of which are hereby incorporated by reference in their entireties.

FIELD OF THE INVENTION

The present invention relates to network security technologies, and in particular, to a method, an apparatus, and a system for detecting Botnet.

BACKGROUND OF THE INVENTION

A Botnet lets plenty of hosts be infected with a Bot program by using one or more propagation means, and therefore, forms a network of one-to-many control between the controller and the infected hosts. Bot is the abbreviation for the robot, and a Bot program is a program which can be executed to implement predefined functions, remotely controlled by a predefined command, and characterized by certain artificial intelligence. A Bot host is a computer with a Bot or another remote controllable program, and the Bot host can be remotely controlled by an attacker.

A Botnet is an attack platform, from which various network attacks may be launched to break down the entire infrastructure network or an important application system, steal plenty of secret information or personal privacy, or commit crimes such as network fraudulence. A Botnet may be used to launch network attacks such as Distribution Denial of Service (DDOS) attacks, send junk mails, steal secrets and abuse network resources etc. These network attacks bring serious consequences to both the entire network and the users.

At present, the topology of a Botnet is diverse. One of the Botnet topologies is a multi-level control tree, and another topology is based on an Internet Relay Chat (IRC) protocol. In an IRC-based Botnet, the controller creates a communication channel on an IRC server, and the Bot host logs in to the IRC server and joins the communication channel beforehand to wait for instructions from the controller. The controller issues instructions on the specified channel of the IRC server, and the Bot host executes an instruction to launch an attack upon receiving the instruction. Another Botnet is based on a Point-to-Point (P2P) structure.

In the conventional art, Botnet is detected in two ways. One method is to obtain a sample of the Bot program by means such as honeypot, analyze malicious codes through reverse engineering in order to obtain the hidden information required for logging in to the Botnet from the codes, and use a customized Bot program to log in the Botnet and take further actions. The other method is to research the change of network traffic of the Bot computer behaviors, and use offline and online analysis methods to identify the Botnet.

In the process of developing the present invention, the inventor finds that the conventional art does not support real-time monitoring on the Botnet and generating a topology of the Botnet.

SUMMARY OF THE INVENTION

An embodiment of the present invention provides a method, an apparatus, and a system for detecting Botnet, so as to monitor the Botnet and generate a topology of the Botnet in real time.

To fulfill such objectives, an embodiment of the present invention provides a method for detecting Botnet, including:

obtaining an address information about a control host in a Bot sample by using an auto breakout environment;

sending a query request message to a traffic analysis device to obtain an address information of a Bot host connected with the control host, in which the query request message carries the address information about the control host; and receiving a query response message returned by the traffic analysis device, in which the query response message carries the address information of the Bot host connected with the control host.

An embodiment of the present invention provides an apparatus for detecting Botnet, including:

an address obtaining module, configured to obtain an address information about a control host in a Bot sample by using an auto breakout environment;

a sending module, configured to send a query request message to a traffic analysis device to obtain an address information of a Bot host connected with the control host, in which the query request message carries the address information about the control host; and a receiving module, configured to receive a query response message returned by the traffic analysis device, in which the query response message carries the address information of the Bot host connected with the control host.

An embodiment of the present invention provides a system for detecting Botnet that includes the foregoing apparatus for detecting Botnet and a traffic analysis device. The traffic analysis device is configured to receive a query request message and obtain an address information of a Bot host connected with a control host according to Domain Name Server (DNS) response information returned by the control host.

In the method, apparatus and system for detecting Botnet in the embodiments of the present invention, after a Bot sample is obtained, the address information about the control host in the Bot sample is obtained by using the auto breakout environment, and then a query request message is sent to the traffic analysis device. The query response message returned by the traffic analysis device carries the address information of the Bot host which is controlled by the control host. In this way, the information of a Botnet is obtained in real time to generate a topology of the Botnet.

BRIEF DESCRIPTION OF THE DRAWINGS

To describe the technical solution of the present invention more clearly, the following outlines the accompanying drawings involved in description of the embodiments of the present invention. Apparently, the accompanying drawings are illustrative rather than exhaustive, and persons of ordinary skill in the art can derive other drawings from them without any creative effort.

DETAILED DESCRIPTION OF THE EMBODIMENTS

The following detailed description is given in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the protection scope of the present invention.

The technical solution of the present invention is detailed below with reference to accompanying drawings and preferred embodiments.

Figure 1:
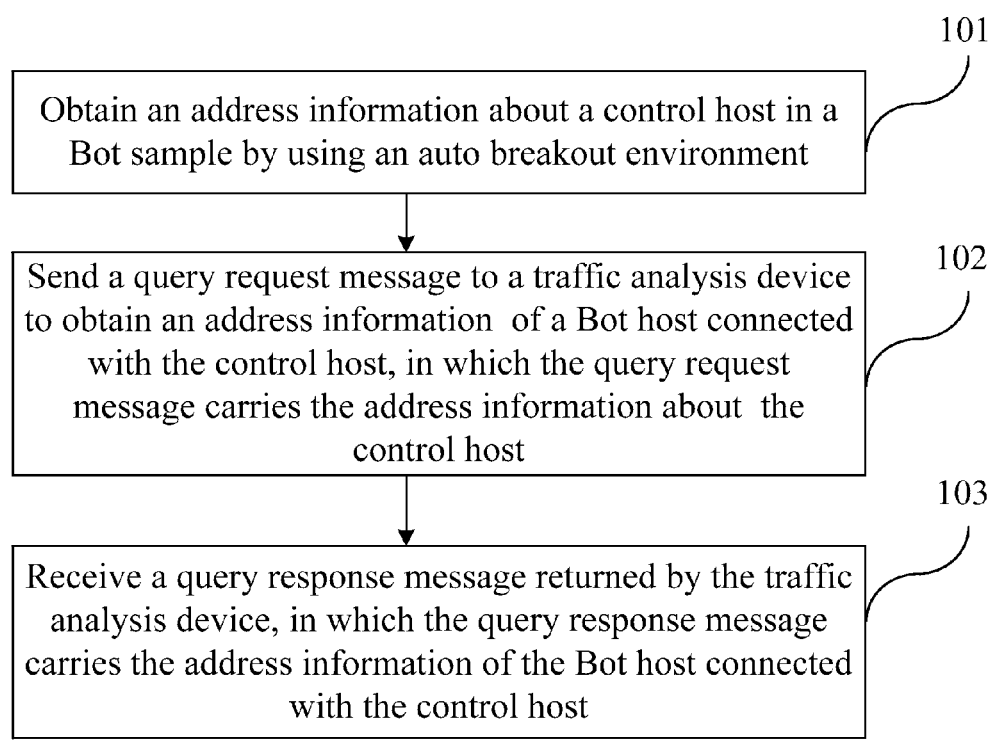
FIG. 1 is a schematic flowchart of a method for detecting Botnet according to an embodiment of the present invention.

An embodiment of the present invention provides a method for detecting Botnet. FIG. 1 is a schematic flowchart of a method for detecting Botnet according to an embodiment of the present invention. As shown in FIG. 1, the method includes the following steps:

Step 101: Obtain an address information about a control host in a Bot sample by using an auto breakout environment. In this step, the auto breakout environment refers to an environment in which the Botnet detection apparatus obtains an active Bot sample was executed on a virtual machine after the active Bot sample was obtained by an apparatus for detecting Botnet.

Step 102: Send a query request message to a traffic analysis device to obtain an address information of a Bot host connected with the control host, in which the query request message carries the address information of the control host.

Step 103: Receive a query response message returned by the traffic analysis device, in which the query response message carries the address information of the Bot host connected with the control host.

In the method for detecting Botnet provided in this embodiment, after a Bot sample is obtained, the address information about of the control host in the Bot sample is obtained by using the auto breakout environment, and then a query request message is sent to the traffic analysis device. The query response message returned by the traffic analysis device carries the address information of the Bot host controlled by the control host. In this way, the information of a Botnet is obtained in real time to generate a topology of the Botnet. In step 101, the Bot sample of the Botnet may be obtained by using a honeynet technology or a web crawler technology. That is, the details of obtaining the address information about the control host in the Bot sample by using the auto breakout environment are: using the auto breakout environment to obtain the address information about the control host corresponding to the Bot sample, where the Bot sample is obtained by using the honeynet technology or the web crawler technology. The auto breakout environment is designed to run the Bot sample automatically.

The address information about the control host may include domain name information and port information of the control host, or include the IP address and port information of the control host, or include the domain name information, IP address, and port information of the control host.

In the embodiment described above, the address information of the Bot host may be the IP address and port information of the Bot host. In the embodiment described above, the traffic analysis device may be a Deep Packet Inspection (DPI) device, a DDOS detection device, a firewall, or a Unified Threat Management (UTM) device. On the basis of the embodiment shown in FIG. 3, the method for detecting Botnet may further include: constructing a topology of the Botnet according to the address information of the control host and the Bot host.

In step 102 above, a query request message in which carries the address information about the control host is sent to the traffic analysis device. After receiving the query request message, the traffic analysis device obtains the address information of the Bot host connected with the control host according to the DNS response information returned by the control host. The details of step 103 may be: receiving a query response message returned by the traffic analysis device, in which the query response message carries the address information of the Bot host connected with the control host, and the address information of the Bot host is obtained according to the DNS response information returned by the control host.

Figure 2:
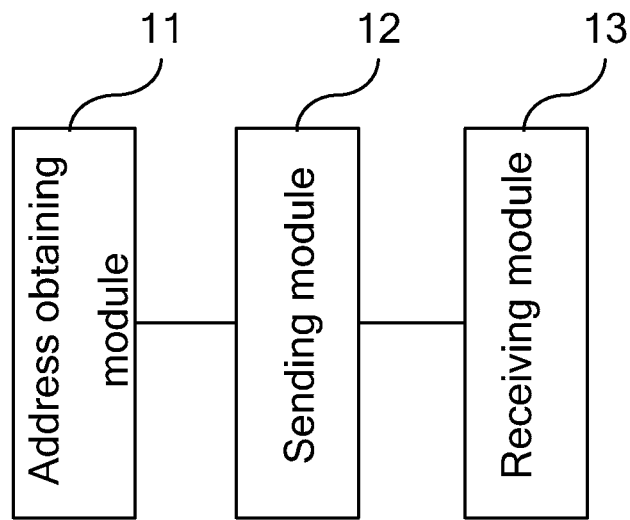
FIG. 2 is a schematic structure diagram of an apparatus for detecting Botnet according to an embodiment of the present invention.

An embodiment of the present invention provides an apparatus for detecting Botnet. FIG. 2 is a schematic structure diagram of an apparatus for detecting Botnet according to an embodiment of the present invention. As shown in FIG. 2, the apparatus for detecting Botnet includes an address obtaining module 11, a sending module 12, and a receiving module 13. The address obtaining module 11 is configured to obtain an address information about a control host in a Bot sample by using an auto breakout environment. The sending module 12 is configured to send a query request message to a traffic analysis device to obtain an address information of a Bot host connected with the control host, in which the query request message carries the address information about the control host. The receiving module 13 is configured to receive a query response message returned by the traffic analysis device, in which the query response message carries the address information of the Bot host connected with the control host.

In the apparatus for detecting Botnet provided in this embodiment, after a Bot sample is obtained, the address information about the control host in the Bot sample is obtained by using the auto breakout environment, and then a query request message is sent to the traffic analysis device. The query response message returned by the traffic analysis device carries the address information of the Bot host controlled by the control host. In this way, the information of a Botnet is obtained in real time to generate a topology of the Botnet.

In the embodiment described above, the address obtaining module may include a first obtaining unit, which is configured to obtain the address information about the control host in the Bot sample by using an auto breakout environment, where the Bot sample is obtained by using a honeynet technology or a web crawler technology.

The Botnet detection apparatus may further include a constructing module, which is configured to construct a topology of the Botnet according to the address information of the control host and the Bot host.

Figure 3:
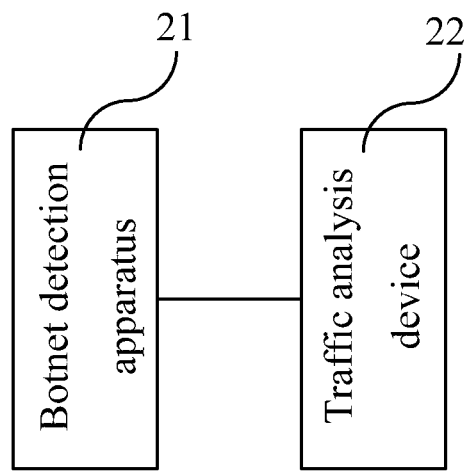
FIG. 3 is a schematic structure diagram of a system for detecting Botnet according to an embodiment of the present invention.

An embodiment of the present invention provides a system for detecting Botnet. The system for detecting Botnet includes a traffic analysis device described above and the Botnet detection apparatus provided in the preceding embodiment. FIG. 3 is a schematic structure diagram of a system for detecting Botnet according to an embodiment of the present invention. As shown in FIG. 3, the system includes a Botnet detection apparatus 21 and a traffic analysis device 22. The Botnet detection apparatus 21 is configured to: obtain the address information about the control host in the Bot sample by using an auto breakout environment; send a query request message to the traffic analysis device to obtain the address information of the Bot host connected with the control host, in which the query request message carries the address information about the control host; and receive a query response message returned by the traffic analysis device, in which the query response message carries the address information of the Bot host connected with the control host. The traffic analysis device 22 is configured to receive a query request message and obtain an address information of a Bot host connected with a control host according to a DNS response information returned by the control host.

In the system for detecting Botnet provided in this embodiment, after a Bot sample is obtained, the address information about the control host in the Bot sample is obtained by using the auto breakout environment, and then a query request message is sent to the traffic analysis device. The query response message returned by the traffic analysis device carries the address information of the Bot host controlled by the control host. In this way, the information of a Botnet is obtained in real time to generate a topology of the Botnet.

In the embodiment described above, the traffic analysis device in the system for detecting Botnet may be a DPI device, a DDOS detection device, a firewall, or a UTM device.

Figure 4:
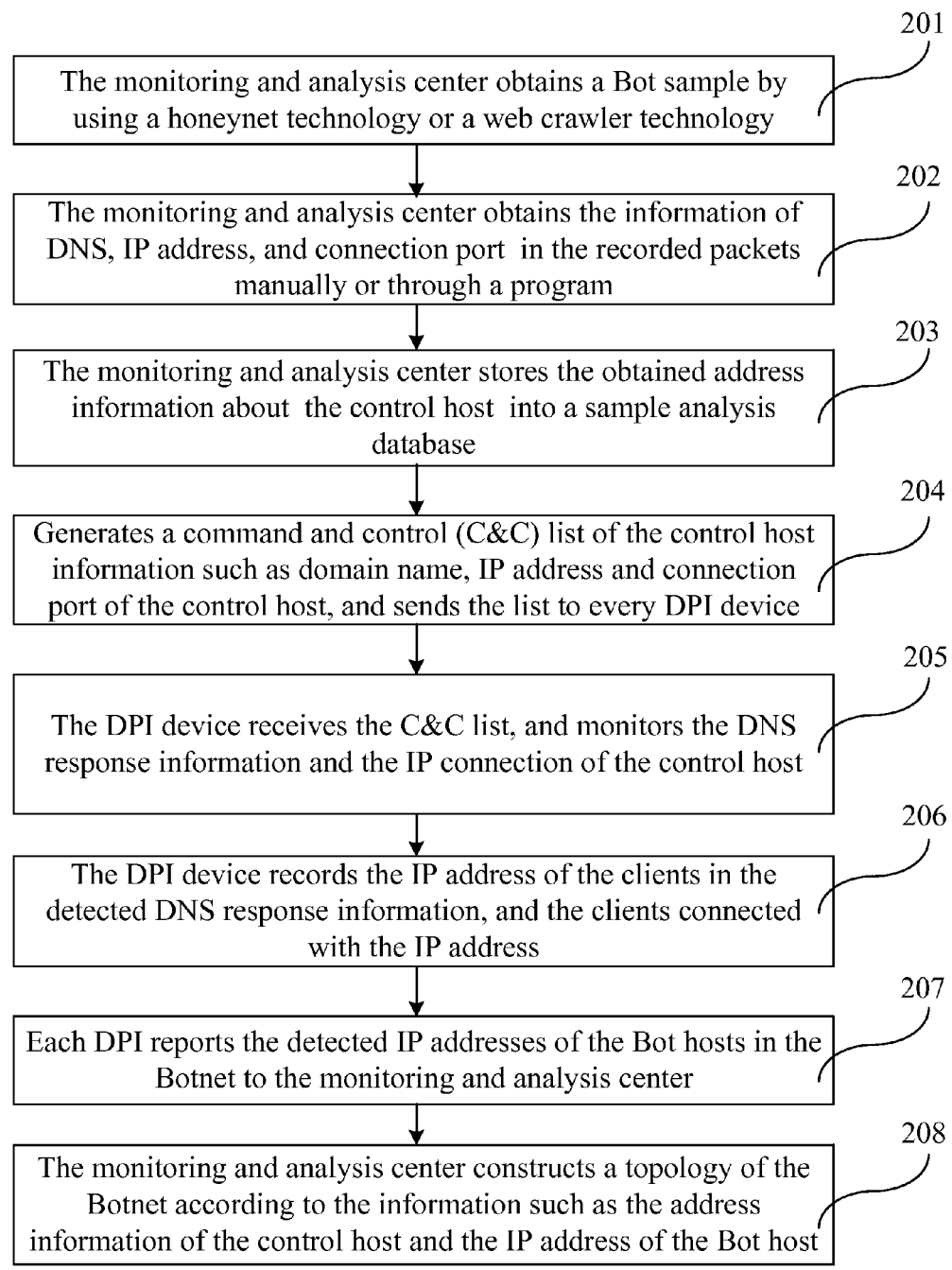
FIG. 4 is a flowchart of an instance of a method for detecting Botnet according to an embodiment of the present invention.

The following is an instance of the present invention. FIG. 4 is a flowchart of an instance of a method for detecting Botnet according to an embodiment of the present invention. In this instance, the system for detecting Botnet includes a monitoring and analysis center (equivalent to the foregoing Botnet detection apparatus) and a DPI device (equivalent to the foregoing traffic analysis device). The DPI device includes a foreground and a background. The foreground is designed to obtain and analyze traffic, and the background is designed to statisticize, summarize and demonstrate services. The method for detecting Botnet may include the following steps:

Step 201: The monitoring and analysis center obtains an active Bot sample by using a honeynet technology or a web crawler technology, executes the Bot sample on a virtual machine, and records communication packets sent out by the Bot sample.

Specifically, the monitoring and analysis center obtains an active Bot sample by using a honeynet technology or a web crawler technology, loads the Bot sample program into a virtual machine, invokes an Application Program Interface (API) of the virtual machine to run the Bot sample program automatically, and records communication packets sent out by the Bot sample.

Step 202: The monitoring and analysis center obtains the information of DNS, IP address, and connection port in the recorded packets manually or through a program and discovers a control server which connected to the Bot sample steadily from external, and determines this server as a control host of the Botnet.

Step 203: The monitoring and analysis center stores the obtained address information about the control host into a sample analysis database.

Step 204: Generates a command and control (C&C) list of the control host information such as domain name, IP address and connection port of the control host, and sends the list to every DPI device by using the interaction capability of the monitoring and analysis center.

Specifically, the C&C list is a list of Botnet commands and control server information, that is, the C&C list is a list for recording the information about the server engaged in sending Botnet commands and controlling forwarding information.

Step 205: The DPI device receives the C&C list, and monitors the DNS response information and connection information of the control host, namely, monitors the information about the clients that are connected with the domain names, ports and IP addresses in the C&C list.

Step 206: The DPI device detects the DNS response information. If a client performs DNS query and the domain name information in the returned DNS response information is consistent with the domain name in the C&C list, the DPI device regards the client as a Bot host. The DPI device also regards the clients connected with the domain names, ports and IP addresses in the C&C list as Bot hosts in the Botnet, and obtains the IP addresses of such clients, but ignores the data indicating the DNS server as a client in the DNS response information, because this step aims at obtaining the IP address of the Bot host.

Step 207: Each DPI reports the detected IP addresses of the Bot hosts in the Botnet to the monitoring and analysis center, and generates a Bot list of the Bot hosts.

Step 208: The monitoring and analysis center constructs a topology of the Botnet according to the information such as the address information of the control host and the IP address of the Bot host.

Figure 5:
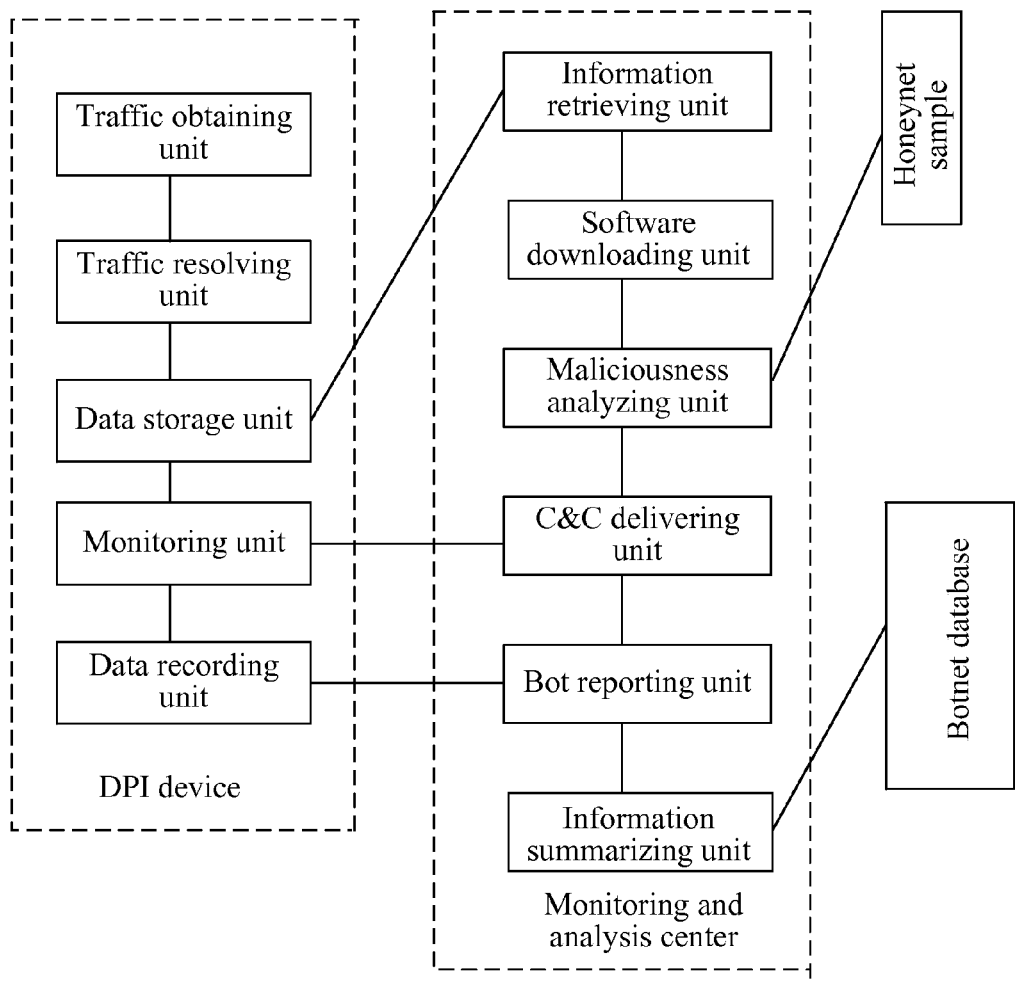
FIG. 5 is a schematic structure diagram of an instance of a system for detecting Botnet according to an embodiment of the present invention.

Described above is an instance of a method for detecting Botnet. The main steps of the method are performed by the monitoring and analysis center, and the DPI device. As shown in FIG. 5, the DPI device may be further divided into a traffic obtaining unit, a traffic resolving unit, a data storage unit, a monitoring unit, and a data recording unit. The monitoring and analysis center includes an information retrieving unit, a software downloading unit, a maliciousness analyzing unit, a C&C delivering unit, a Bot reporting unit, and an information summarizing unit. The traffic obtaining unit is configured to obtain network traffic. The traffic resolving unit is configured to resolve traffic data, where the data is downloaded into files of a PE format. The data storage unit is configured to record the links from which the data is downloaded, and sends the recorded links to the information retrieving unit of the monitoring and analyzing center. The information retrieving unit retrieves the information about the links from which the data is downloaded, and sends the information to the software downloading unit. The software downloading unit uses a crawler technology to download the PE file, sends the PE file to the maliciousness analyzing unit, and the maliciousness analyzing unit analyzes and judges whether the PE file is a Bot sample. The maliciousness analyzing unit may be connected with a sample obtaining unit, and obtains the PE file through a honeynet technology. If the PE file is a Bot sample, the C&C delivering unit obtains the address information about the control host in the Bot sample by using the auto breakout environment, especially the domain name of the control host, generates a C&C list according to the address information and sends the list to the monitoring unit of the DPI device. The monitoring unit monitors the DNS response information from the control host, and obtains the IP address of the Bot host connected with the control host. The data recording unit records the IP address and forwards the IP address to the Bot reporting unit of the monitoring and analyzing center. The information summarizing unit sums up the address information, and constructs a topology of the Botnet according to the address information about the control host and the IP address of the Bot host. The received Botnet information may be stored into a Botnet database.

In the method, apparatus and system for detecting Botnet in the embodiments of the present invention, after a Bot sample is obtained, the address information about the control host in the Bot sample is obtained by using the auto breakout environment, and then a query request message is sent to the traffic analysis device. The query response message returned by the traffic analysis device carries the address information of the Bot host controlled by the control host. In this way, the information of the Botnet is obtained in real time to form a topology of the Botnet.

Finally, it should be noted that the above embodiments are merely provided for describing the technical solutions of the present invention, but not intended to limit the present invention. It is apparent that persons skilled in the art can make various modifications and variations to the invention without departing from the spirit and scope of the invention. The present invention is intended to cover the modifications and variations provided that they fall in the scope of protection defined by the following claims or their equivalents.

What is claimed is:

1. A method for detecting Botnet, comprising:
obtaining, by a processor comprised in a Botnet detection apparatus, address information about a control host in a Bot sample by using an auto breakout environment;
sending, by the processor, a query request message to a traffic analysis device to obtain an address information of a Bot host connected with the control host, wherein the query request message carries the address information of the control host and the address information of the control host includes domain name information of the control host; and
receiving, by the processor, a query response message returned by the traffic analysis device, wherein the query response message carries the address information of the Bot host connected with the control host;
wherein the address information of the Bot host is obtained by the traffic analysis device according to Domain Name Server (DNS) response information returned by control host, and
wherein if a client performs DNS query and domain name information in the returned DNS response information is consistent with the domain name information of the control host, the client is regarded as a Bot host.

2. The method according to claim 1, wherein:
the address information about the control host comprises domain name information and port information of the control host, or comprises Internet Protocol (IP) address information and port information of the control host, or comprises the domain name information, IP address information, and port information of the control host.

3. The method according to claim 1, wherein:
the address information of the Bot host comprises Internet Protocol (IP) address information and port information of the Bot host.

4. The method according to claim 1, further comprising:
constructing, by the processor, a topology of the Botnet according to the address information of the control host and the Bot host.

5. An apparatus having a processor for detecting Botnet, comprising:
an address obtaining module, configured to instruct the processor to obtain an address information about a control host in a Bot sample by using an auto breakout environment;
a sending module, configured to instruct the processor to send a query request message to a traffic analysis device to obtain an address information of a Bot host connected with the control host, wherein the query request message carries the address information of the control host and the address information of the control host includes domain name information of the control host; and
a receiving module, configured to instruct the processor to receive a query response message returned by the traffic analysis device, where the query response message carries the address information of the Bot host connected with the control host;
wherein the traffic analysis device is configured to receive a query request message and obtain an address information of a Bot host connected with a control host according to Domain Name Server (DNS) response information returned by the control host, and
wherein if a client performs DNS query and domain name information in the returned DNS response information is consistent with the domain name information of the control host, the client is regarded as a Bot host.

6. The apparatus according to claim 5, wherein:
the address information of the control host comprises domain name information and port information of the control host, or comprises Internet Protocol (IP) address information and port information of the control host, or comprises the domain name information, IP address information, and port information of the control host.

7. The apparatus according to claim 5, wherein:
the address information of the Bot host comprises Internet Protocol (IP) address information and port information of the Bot host.

8. A system for detecting Botnet, comprising a Botnet detection apparatus and a traffic analysis device specified in claim 7, wherein:
the traffic analysis device is configured to receive a query request message and obtain an address information of a Bot host connected with a control host according to Domain Name Server (DNS) response information returned by the control host.

9. The apparatus according to claim 5, further comprising:
a constructing module, configured to instruct the processor to construct a topology of the Botnet according to the information about addresses of the control host and the Bot host.

10. A system for detecting Botnet, comprising a Botnet detection apparatus and a traffic analysis device specified in claim 9, wherein:
the traffic analysis device is configured to receive a query request message and obtain an address information of a Bot host connected with a control host according to Domain Name Server (DNS) response information returned by the control host.

11. A system for detecting Botnet, comprising a Botnet detection apparatus and a traffic analysis device specified in claim 5, wherein:
the traffic analysis device is configured to receive a query request message and obtain an address information of a Bot host connected with a control host according to Domain Name Server (DNS) response information returned by the control host.

* * * * *